United States Patent [19]

Sorensen

[11] Patent Number: 4,789,326

[45] Date of Patent: Dec. 6, 1988

[54] STABILIZED-CORE INJECTION MOLDING OF HOLLOW THIN-WALLED PLASTIC PRODUCTS

[75] Inventor: Jens O. Sorensen, Rancho Santa Fe, Calif.

[73] Assignee: Acebo Company, La Jolla, Calif.

[21] Appl. No.: 7,462

[22] Filed: Jan. 28, 1987

[51] Int. Cl.⁴ .................................................. B29C 45/04
[52] U.S. Cl. ................................... 425/575; 249/161; 264/328.7; 264/328.11; 425/577
[58] Field of Search .............. 425/573, 574, 575, 577; 264/294, 328.7, 328.8, 328.11, 328.13; 249/160, 161; 428/35, 36; 229/1.5 B; 220/72; 215/1 C

[56] References Cited

U.S. PATENT DOCUMENTS

| | | | |
|---|---|---|---|
| 2,524,858 | 10/1950 | Thomas | 425/577 X |
| 3,626,051 | 12/1971 | Liautaud | 264/328.8 X |
| 3,767,156 | 10/1973 | Sullivan et al. | 425/577 X |
| 3,917,789 | 11/1975 | Heisler | 264/328.7 X |
| 3,944,124 | 3/1976 | Hexel | 229/1.5 B |
| 4,126,291 | 11/1978 | Gilbert et al. | 425/577 X |
| 4,264,295 | 4/1981 | Hingley | 425/577 |
| 4,285,657 | 8/1981 | Ryder | 425/533 X |
| 4,381,275 | 4/1983 | Sorensen | 264/328.13 X |
| 4,467,994 | 8/1984 | Sorensen | 425/577 X |
| 4,508,676 | 4/1985 | Sorensen | 264/294 X |
| 4,627,810 | 12/1986 | Von Holdt | 425/577 |

FOREIGN PATENT DOCUMENTS 17577  1/1972  Australia .

Primary Examiner—Richard L. Chiesa
Attorney, Agent, or Firm—Edward W. Callan

[57] ABSTRACT

In a mold for injection molding and controlling the dimensions of a hollow plastic product having side walls, in which a first mold part and a second mold part define a mold cavity therebetween, encompasssed by a parting line, for forming the hollow plastic product, and further define a gate for admitting molten injected plastic into the cavity; one of the mold parts includes a retractable portion adjacent the gate, with the retractable portion being removable between a protracted position and a retracted position while the mold is closed; and the mold parts define primary flow channels extending from the gate, which, when the retractable portion of the one mold part is protracted, direct initially injected molten plastic from the gate to create stabilizing regions of stiffened plastic, to thereby impede lateral deflection of the mold parts with respect to each other when additional molten plastic subsequently is injected; whereby the side walls of the molded plastic product are uniformly dimensioned. The mold part/s further define secondary flow channels, which are significantly thicker than adjacent portions of the mold cavity; which are adjacent to the gate but, when the retractable portion is protracted, are isolated from the gate by the retractable portion, which are interposed between the primary flow channels; and which, when the retractable portion is retracted, direct the subsequently injected molten plastic between the stabilizing regions of stiffened plastic and into the side-wall-defining region of the mold cavity, to thereby enhance the flow of the molten plastic into the side-wall-defining regions of the mold cavity.

9 Claims, 4 Drawing Sheets

4,789,326

STABILIZED-CORE INJECTION MOLDING OF HOLLOW THIN-WALLED PLASTIC PRODUCTS

BACKGROUND OF THE INVENTION

The present invention generally pertains to injection molding of hollow plastic products and is particularly directed to an improved mold and method for molding and controlling the dimensions of hollow plastic products having side walls.

In U.S. Pat. No. 4,508,676 to the present inventor, there is generally described a mold and method for molding and controlling the dimensions of hollow plastic products having side walls. The mold described herein includes a first mold part and a second mold part defining a mold cavity therebetween, encompassed by a parting line, for forming the hollow plastic product, and further defining a gate for admitting molten injected plastic into the cavity. One of the mold parts includes a retractable portion adjacent the gate, with the retractable portion being movable between a protracted position and a retracted position while the mold is closed; and the mold parts define primary flow channels extending from the gate, which, when the retractable portion of the one mold part is protracted, direct initially injected molten plastic from the gate to create stabilizing regions of stiffened plastic, to thereby impede lateral deflection of the mold parts with respect to each other when additional molten plastic subsequently is injected, whereby the side walls of the molded plastic product are uniformly dimensioned.

A "flow channel" is defined as a portion of the mold cavity which directs the flow of molten plastic.

"Stiffened plastic" is defined as plastic that is no longer molten and has solidified sufficiently to impede lateral deflection of the mold parts.

In the mold described in U.S. Pat. No. 4,508,676, the mold cavity is centered about an axis, and the gate is axially disposed in the mold cavity. The portions of the mold parts that define the stabilized regions include portions that are approximately parallel to the axis of the mold cavity. Also, the retractable portion of the one mold part is an axially movable inner core section. The retractable portion is retracted by conventional means such as by hydraulic fluid acting upon the appropriate piston surfaces within a double-acting hydraulic cylinder.

SUMMARY OF THE INVENTION

The mold of the present invention is characterized by the mold part/s generally described above further defining secondary flow channels, which are significantly thicker than adjacent portions of the mold cavity; which are adjacent to the gate but, when the retractable portion is protracted, are isolated from the gate by the retractable portion; which are interposed between the prmiary flow channels; and which, when the retractable portion is retracted, direct the subsequently injected molten plastic between the stabilizing regions of stiffened plastic and into the side-wall-defining region of the mold cavity. These secondary flow channels enhance the flow of the molten plastic into the side-wall-defining regions of the mold cavity.

In a separate aspect of the present invention, the mold is characterized by the retractable portion of the one mold part being retractable by reason of being deformable to expose the secondary flow paths to the gate when the pressure of the injected molten plastic is above a given theshold. As a result, the cycle time for molding each product may be less, and complex mechanisms for rapidly retracting and protracting the retractable portion of the one mold part are not required.

The injection molding method of the present invention is an improvement of the method described in the aforementioned U.S. Pat. No. 4,508,676 for controlling the dimensions of a hollow plastic product having side walls by using a mold having a first mold part and a second mold part defining a mold cavity therebetween, encompassed by a parting line, for forming the hollow plastic product, and further defining a gate for admitting molten injected plastic into the cavity; wherein one of the mold parts includes a retractable portion adjacent the gate, and wherein the mold parts define primary flow channels extending from the gate, which, when the retractable portion of the one mold part is protracted, direct initially injected molten plastic from the gate to create stabilizing regions of stiffened plastic, to thereby impede lateral deflection of the mold parts with respect to each other when additional molten plastic subsequently is injected. The method includes the steps of (a) protracting the retractable mold part; (b) injecting molten plastic from the gate and through the primary flow channels to create the stabilizing regions; (c) retracting the retractable mold part; and (d) subsequently injecting additional molten plastic from the gate between the stabilizing regions into the side wall defining region of the mold cavity beyond the stabilizing regions; and is characterized by step (d) including the step of (e) directing the subsequently injected molten plastic through secondary flow channels defined by the mold parts, which flow channels exist but are isolated from the gate when the retractable portion is protracted; which are interposed between the primary flow channels; and which, when the retractable portion is retracted, are significantly thicker than adjacent portions of the mold cavity and the average wall thickness of the mold cavity and direct the subsequently injected molten plastic between the stabilizing regions of stiffened plastic and into the side-wall-defining region of the mold cavity.

In a separate aspect of the present invention, the method is characterized by step (c) including the step of (e) retracting the retractable mold part by deforming the retractable mold part to expose the secondary flow channels to the gate in response to the pressure of the injected plastic being above a given threshold.

Additional features of the invention are described with reference to the description of the preferred embodiments.

DESCRIPTION OF THE PREFERRED EMBODIMENTS

Figure 1:
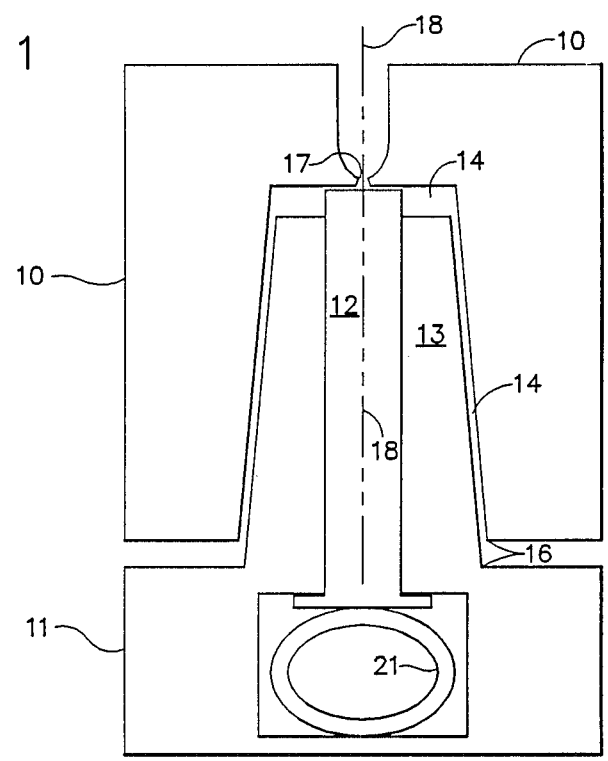
FIG. 1 is a schematic view of a mold according to the present invention having means for passively protracting the retractable portion of one mold part.

Referring to FIG. 1, a mold according to the present invention includes a hollow mold part 10 and a core mold part 11. The core mold part 11 has a retractable inner portion 12 and an outer portion 13. When fitted together to form the mold, the hollow mold part 10 and core mold part 11 define a mold cavity 14 therebetween for forming a hollow plastic product. The two mold parts 10, 11 are encompassed by a parting line 16 and further define a gate 17 for admitting molten injected plastic into the mold cavity 14. the mold cavity 14 is centered about an axis 18, and the gate 17 is axially disposed in the mold cavity 14. The retractable inner core portion 12 is axially-movable and passively protracted by a spring 21 to be in contact with the hollow mold section 10 adjacent the gate 17.

Figure 2:
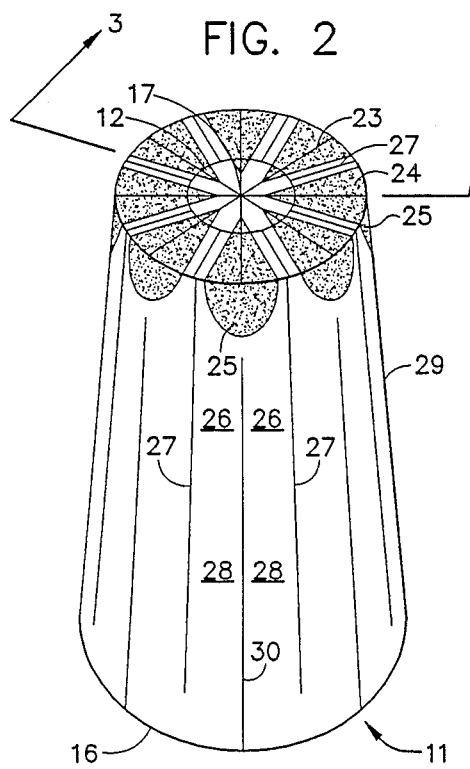
FIG. 2 is a perspective view of a core mold part for use in the mold of FIG. 1 according to one preferred embodiment of the present invention in which the inner portion of the core and mold part is retractable.
Figure 3A:
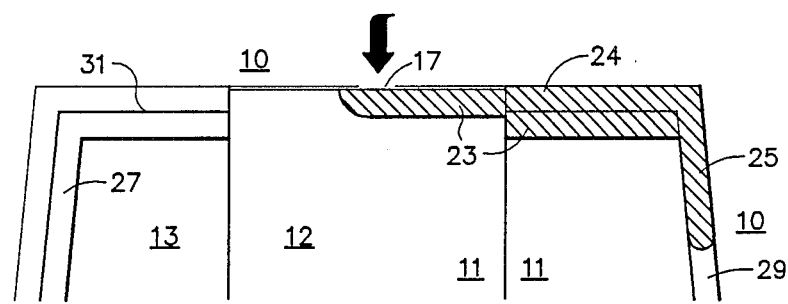
FIG. 3A is a sectional view taken along lines 3—3 in FIG. 2 illustrating the initial injection of molten plastic in a mold cavity with the inner portion of th core mold part of FIG. 2 in a protracted position.
Figure 3B:
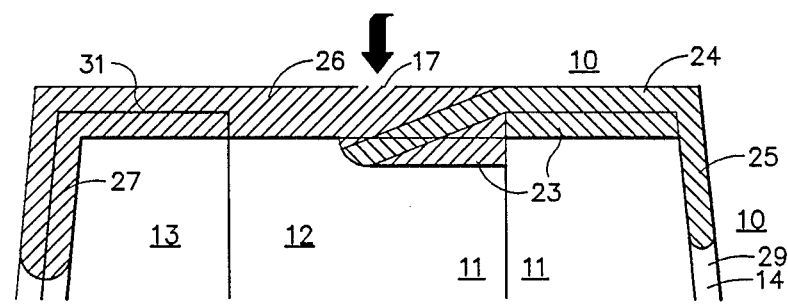
FIG. 3B is a sectional view taken along lines 3—3 in FIG. 2 illustrating the subsequent injection of molten plastic in the mold cavity of FIG. 3A, with the inner portion of the core mold part of FIG. 2 in a retracted position in which the inner portion of the core mold part is retracted beneath the top surface of the outer portion of the core mold part.

Referring to the preferred embodiment of the core mold part 11 shown in FIG. 2, the mold parts 10, 11 define primary flow channels 23 extending from the gate 17. When the retractable inner portion 12 of the core mold part 11 is protracted, as shown in FIG. 3A, the primary flow channels 23 direct initially injected molten plastic 24 from the gate 17 to create stabilizing regions 25 of stiffened plastic, to thereby impede lateral deflection of the mold parts 10, 11 with respect to each other when additional molten plastic 26 subsequently is injected, as shown in FIG. 3B, whereby the side walls of the molded plastic product formed in the mold cavity 14 are uniformly dimensioned.

The mold parts 10, 11 further define secondary flow channels 27. When the retractable inner portion 12 of the core mold part 11 is protracted, as shown in FIG. 3A, the secondary flow channels 27 exist, but they are isolated from the gate 17. In the portion of the mold cavity 14 defined by the outer portion 13 of the core mold part 11, the secondary flow channels 27 are interposed between the primary flow channels 23. When the retractable inner core portion 12 of the core mold part 11 is retracted, as shown in FIG. 3B, the secondary flow channels 27 are significantly thicker than adjacent portions of the mold cavity 14 and the average wall-defining thickness of the mold cavity 14 and direct the subsequently injected molten plastic 26 between the stabilizing regions 25 of stiffened plastic and into the side-wall-defining regions 29 of the mold cavity 14, to thereby enhance the flow of the molten plastic into the side-wall-defining regions 29 of the mold cavity 14. The side-wall-defining regions 29 of the mold cavity 14 include thin cavity regions 28.

The mold parts 11, 12 further define meld chambers 30 interposed between the secondary flow channels 27 in the side-wall-defining regions 29 of the mold cavity 14. A "meld chamber" is a portion of the mold cavity that is thickner than the thin cavity region 28 to enhance the melding of plastic flowing from different directions into and joining together in said chamber. A mold defining meld chambers and the use threof are the subject of a patent application entitled "Injection Molding of Thin-Walled Plastic Products", being filed by the present inventor, Jens Ole Sorensen, or even date herewith.

The method of using a mold containing the core mold part of FIG. 2 is described with reference to FIGS. 3A, 3B and 3C. Referring first to FIG. 3A, the retractable inner portion 12 of the core mold part 11 is protracted by hydraulic means to be in contact with the hollow core section 10; and molten plastic 24 is injected from the gate 17 and through the primary flow channels 23 to create stabilizing regions 25 of stiffened plastic.

The inner core portion 12 is then retracted by hydraulic means to a position beneath the top surface 31 of the outer portion 13 of the core mold part 11, as shown in FIG. 3B; in order to provide ample space for the flow when additional molten plastic 26 is injected from the gate 17 and directed by the secondary flow channels 27 between the stabilizing regions 25 of stiffened plastic into the side-wall-defining regions 29 of the mold cavity 14.

Figure 3C:
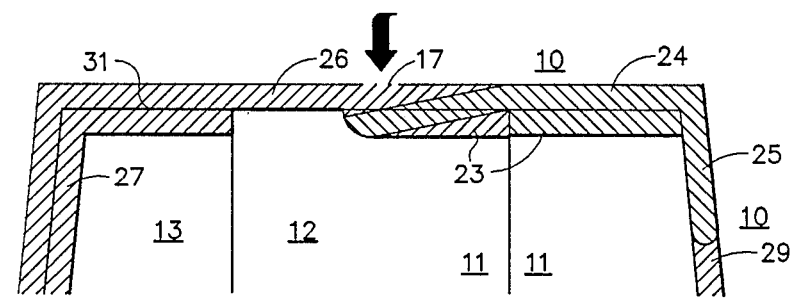
FIG. 3C is a sectional view taken along lines 3—3 in FIG. 2 illustrating the mold cavity following the subsequent injection of molten plastic in the mold cavity shown in FIG. 3B, with the inner portion of the core mold part of FIG. 2 moved into a retracted position in which the inner portion of the core mold part is flush with the top surface of the outer portion of the core mold part.

The inner core portion 12 is then protracted by hydraulic means to a position flush with the top surface 31 of the outer core portion 13 of the core mold part 11, as shown in FIG. 3C, whereby the injected molten plastic cools faster in the mold since the wall thickness of the injected plastic adjacent the movable core becomes thinner.

Alternative to the use of hydraulic means in the embodiment of FIGS. 3A to 3C, the protraction of the retractable inner portion 12 of the core mold part 11 to the different positions shown in FIGS. 3A and 3C can be accomplished by passive means such as the spring 21 by varying the amount of the pressure at which the molten plastic is injected. The injection pressure opposes the spring force.

Figure 4:
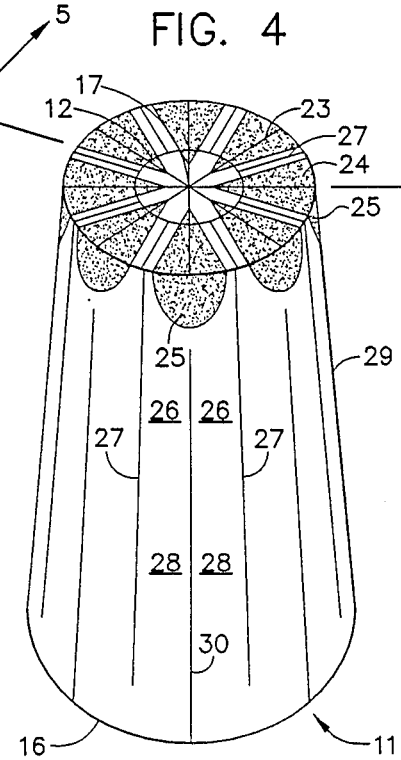
FIG. 4 is a perspective view of a core mold part for use in the mold of FIG. 1 according to an alternative preferred embodiment of the present invention in which the inner portion of the core mold part is retractable.
Figure 5A:
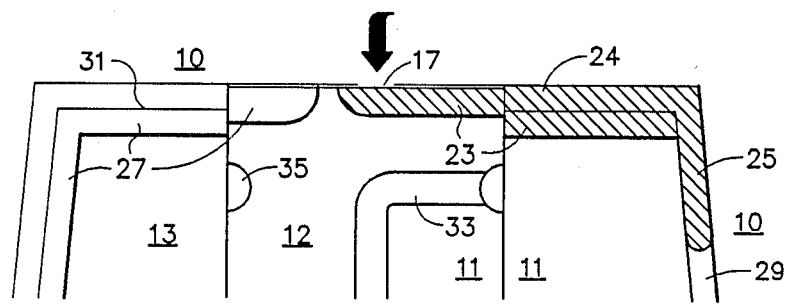
FIG. 5A is a sectional view taken along lines 5—5 in FIG. 4 illustrating the initial injection of molten plastic in a mold cavity with the inner portion of the core mold part of FIG. 4 in a protracted position.
Figure 5B:
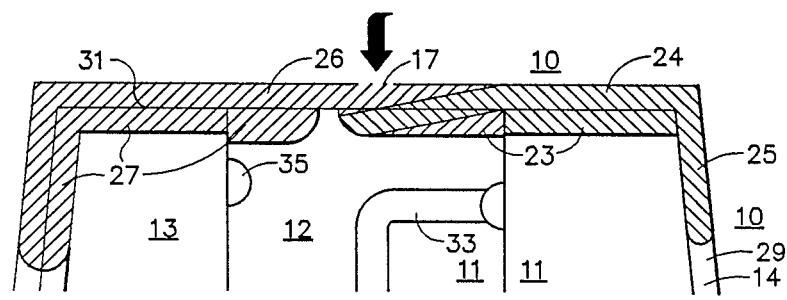
FIG. 5B is a sectional view taken along lines 5—5 in FIG. 4 illustrating the subsequent injection of molten plastic in the mold cavity of FIG. 5A, with the inner portion of the core mold part of FIG. 4 in a retracted position in which the inner portion of the core mold part is flush with the top surface of the outer portion of the core mold part.

Referring to the preferred embodiment of the core mold part 11 shown in FIG. 4, the mold parts 10, 11 define primary flow channels 23 extending from the gate 17. When the retractable inner portion 12 of the core mold part 11 is protracted, as shown in FIG. 5A, the primary flow channels 23 direct initially injected molten plastic 24 from the gate 17 to create stabilizing regions 25 of stiffened plastic, to thereby impede lateral deflection of the mold parts 10, 11 with respect to each other when additional molten plastic 26 subsequently is injected, as shown in FIG. 5B, whereby the side walls of the molded plastic product formed in the mold cavity 14 are uniformly dimensioned.

The mold parts 10, 11 further define secondary flow channels 27. When the retractable inner portion 12 of the core mold part 11 is protracted, as shown in FIG. 5A, the secondary flow channels 27 exist, but they are isolated from the gate 17. In contrast to the embodiment of FIG. 2, the secondary flow channels 27 are interposed between the primary flow channels 23 in the portions of the mold cavity 14 defined by both the inner portion 12 and the outer portion 13 of the core mold part 11. When the retractable inner core portion 12 of the core mold part 11 is retracted, as shown in FIG. 5B, the flow channels 27 are significantly thicker than adjacent portions of the mold cavity 14 and the average wall-defining thickness of the mold cavity 14 and direct the subsequently injected molten plastic 26 between the stabilizing regions 25 of stiffened plastic and into the side-wall-defining regions 29 of the mold cavity 14, to thereby enhance the flow of the molten plastic into the side-wall-defining regions 29 of the mold cavity 14.

The mold parts 11, 12 further define meld chambers 30 interposed between the secondary flow channels 27 in the side-wall-defining regions 29 of the mold cavity 14.

The method of using a mold containing the core mold part of FIG. 4 is described with reference to FIGS. 5A, 5B and 5C. Referring first to FIG. 5A, the retractable inner portion 12 of the core mold part 11 is passively protracted by the spring 21 (FIG. 1) to be in contact with the hollow core section 10; and molten plastic 24 is injected from the gate 17 and through the primary flow channels 23 to create stabilizing regions 25 of stiffened plastic.

The inner core portion 12 is then retracted in response to the pressure of the injected molten plastic being above a given threshold to a position flush with the top surface 31 of the outer portion 13 of the core mold portion 11, as shown in FIG. 5B, to thereby expose the secondary flow channels 27 to the gate 17; and additional molten plastic 26 is injected from the gate 17 and directed by the secondary flow channels 27 between the stabilizing regions 25 of stiffened plastic into the side-wall-defining regions 29 of the mold cavity 14. Since the inner core portion 12 is not retracted to a position beneath the top surface 31 of the outer portion 13 of the core part 11, as is shown in FIG. 3B, it is not necessary to include the additional step of protracting the inner core portion 12 to such position as is shown in FIG. 3C.

Figure 5C:
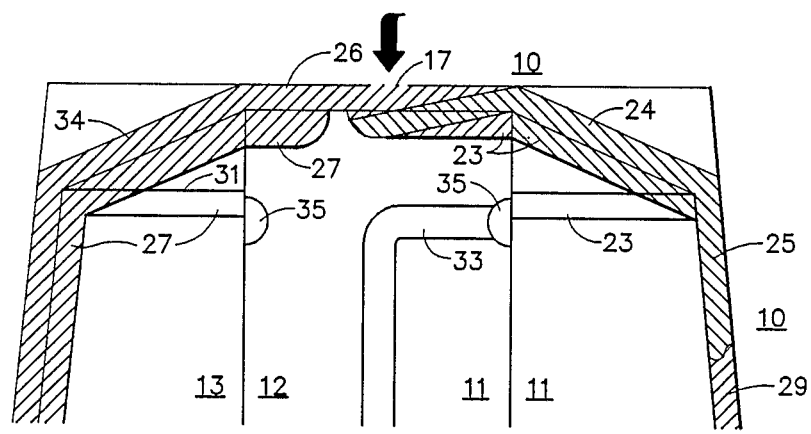
FIG. 5C is a sectional view taken along lines 5—5 in FIG. 4 illlustrating the mold cavity following the subsequent injection of molten plastic in the mold cavity shown in FIG. 5B, in which the cavity is opened and the inner portion of the core mold part of FIG. 4 is moved into an extended position for enabling an air burst from within the inner portion of the core mold part to eject the molten plastic product from the core mold part.

After the mold cavity 14 is filled with injected molten plastic and the molded plastic product has cooled, the mold 10 is opened and the inner core portion 12 is then passively extended by the spring 21 to a position beyond its initial position shown in FIG. 5A to expose an air vent 33 within the inner core portion 12 of the core mold part 11, as shown in FIG. 5C. Air is then admitted through the air vent 33 to blow the molded plastic product 34 away from the core portion 11. The opening 35 of the air vent 33 extends all the way around the core mold part 11. Alternatively, hydraulic means can be used in the embodiment of FIGS. 5A to 5C for protracting and retracting the inner core portion 12 of the core mold part 11.

Figure 6:
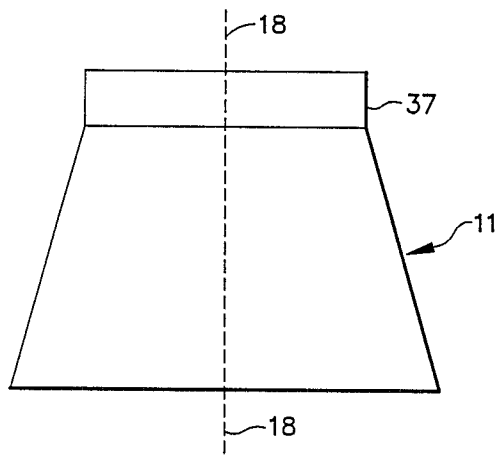
FIG. 6 illustrates the preferred shape of the core mold part when the entire core mold part is retractable.

In an alternative preferred embodiment the entire core mold part is of unitary construction and retractable. Such retractable core mold part defines the same pattern of flow channels 23, 27 and meld chambers 30 as the core mold part embodiments of either FIG. 2 or FIG. 4. However, the entirely retractable core mold part is shaped as shown in FIG. 6, wherein the portions 37 of mold parts that define the stabilizing regions 25 in the mold cavity 14 are approximately parallel to the axis 18 of the mold cavity 14. This feature allows the core mold part 11 to be steered when it is retracted.

Figure 7:
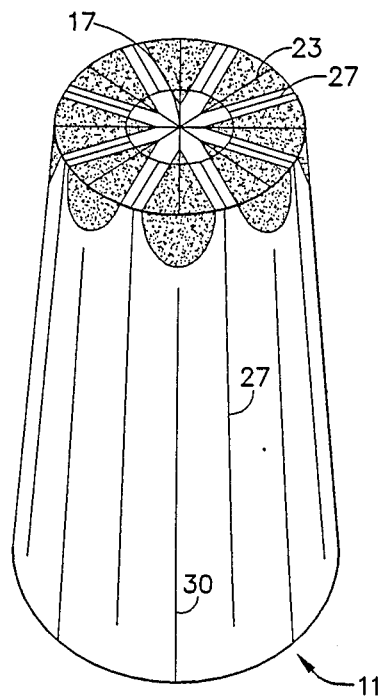
FIG. 7 is a perspective view of a core mold part according to still another preferred embodiment of the present invention, wherein the inner portion of the core mold part is retractable by reason of being deformable.

In still another preferred embodiment of the core mold part, as shown in FIG. 7, the core mold part 11 is of unitary construction and is hollow inside. In other respects, it defines the same pattern of flow channels 23, 27 and meld chambers 30 as the core mold part shown in FIG. 4. In the embodiment of FIG. 7, the center portion of the core mold part 11 adjacent the gate 17 is retractable by reason of being deformable to expose the secondary flow channels 27 to the gate when the pressure of the injected molten plastic is above a given threshold.

The retractable portion has been described above as being positioned in only the core part of the mold. It should be understood that the retractable portion also or alternatively may be positioned in the cavity part of the mold, as well.

I claim:

1. A mold for injection molding and controlling the dimensions of a hollow plastic product having side walls, comprising a first mold part and a second mold part defining a mold cavity therebetween, encompassed by a parting line, for forming the hollow plastic product, and further defining a gate for admitting molten injected plastic into the cavity;

wherein one of the mold parts includes a retractable portion adjacent the gate, with the retractable portion being movable between a protracted position and a retracted position while the mold is closed; and wherein the mold parts define primary flow channels extending from the gate, which, when the retractable portion of the one mold part is protracted, direct initially injected molten plastic from the gate to create stabilizing regions of stiffened plastic, to thereby impede lateral deflection of the mold parts with respect to each other when additional molten plastic subsequently is injected;

characterized by the mold parts further defining secondary flow channels which are significantly thicker than adjacent portions of the mold cavity; which are adjacent to the gate but, when the retractable portion is protracted, are isolated from the gate by the retractable portion; which are interposed between the primary flow channels; and which when the retractable portion is retracted, direct the subsequently injected molten plastic between the stabilizing regions of stiffened plastic and into the side wall defining region of the mold cavity.

2. A mold according to claim 1, wherein the mold cavity is centered about an axis, and the gate is axially disposed in the mold cavity.

3. A mold according to claim 2, wherein the retractable portion of the one mold part comprises an axially movable inner core section.

4. A mold according to claim 1, wherein the retractable portion of the one mold part is the entire cavity defining portion of the one mold part.

5. A mold according to claim 1, wherein the retractable portion of the one mold part is retractable by reason of being deformable to expose the secondary flow channels to the gate when the pressure of the injected molten plastic is above a given threshold.

6. A mold according to claim 1, further comprising means for passively protracting the retractable portion of the one mold part.

7. A mold according to claim 6, wherein the retractable portion of the one mold part is retractable to expose the secondary flow channels to the gate in rsponse to the pressure of the injected molten plastic being above a given threshold.

8. A mold according to claim 1, wherein the retractable portion of the one mold part is retractable to expose the secondary flow channels to the gate in response to the pressure of the injected molten plastic being above a given threshold.

9. A mold according to claim 1, wherein the mold cavity is centered about an axis and wherein the portions of the mold parts that define the stabilizing regions are approximately parallel to the axis of the mold cavity.

* * * * *